United States Patent [19]

Mellert

[11] Patent Number: 4,652,182
[45] Date of Patent: Mar. 24, 1987

[54] MILLING CUTTER HAVING INTERCHANGEABLE CUTTER BLADES

[75] Inventor: Erwin Mellert, Horb am Neckar, Fed. Rep. of Germany

[73] Assignee: Ledermann GmbH & Co., Horb am Neckar, Fed. Rep. of Germany

[21] Appl. No.: 774,670

[22] Filed: Sep. 11, 1985

[30] Foreign Application Priority Data

Sep. 13, 1984 [DE] Fed. Rep. of Germany ....... 8427007

[51] Int. Cl.$^4$ ............................................. B26D 1/00
[52] U.S. Cl. ...................................... 407/48; 407/49; 144/230
[58] Field of Search ............................ 407/34, 36–42, 407/48, 49, 53; 144/218–220, 227, 230

[56] References Cited

U.S. PATENT DOCUMENTS

| | | | |
|---|---|---|---|
| 1,194,865 | 8/1916 | Muller | 144/230 |
| 1,962,163 | 6/1934 | Weddell | 407/37 |
| 3,217,384 | 11/1965 | Wirfelt | 407/36 |
| 3,791,429 | 2/1974 | Morris | 407/49 |

Primary Examiner—Leonidas Vlachos
Attorney, Agent, or Firm—Bachman & LaPointe

[57] ABSTRACT

The invention relates to a milling cutter having interchangeable cutter blades which are fixed in grooves in the milling cutter body by means of clamping elements. The cutter blades have integrally formed radial and axial support mountings, by which means a simple and precise mounting of the cutter blades is achieved. The seating surfaces made at the milling cutter body are made as simple, flat surfaces.

10 Claims, 4 Drawing Figures

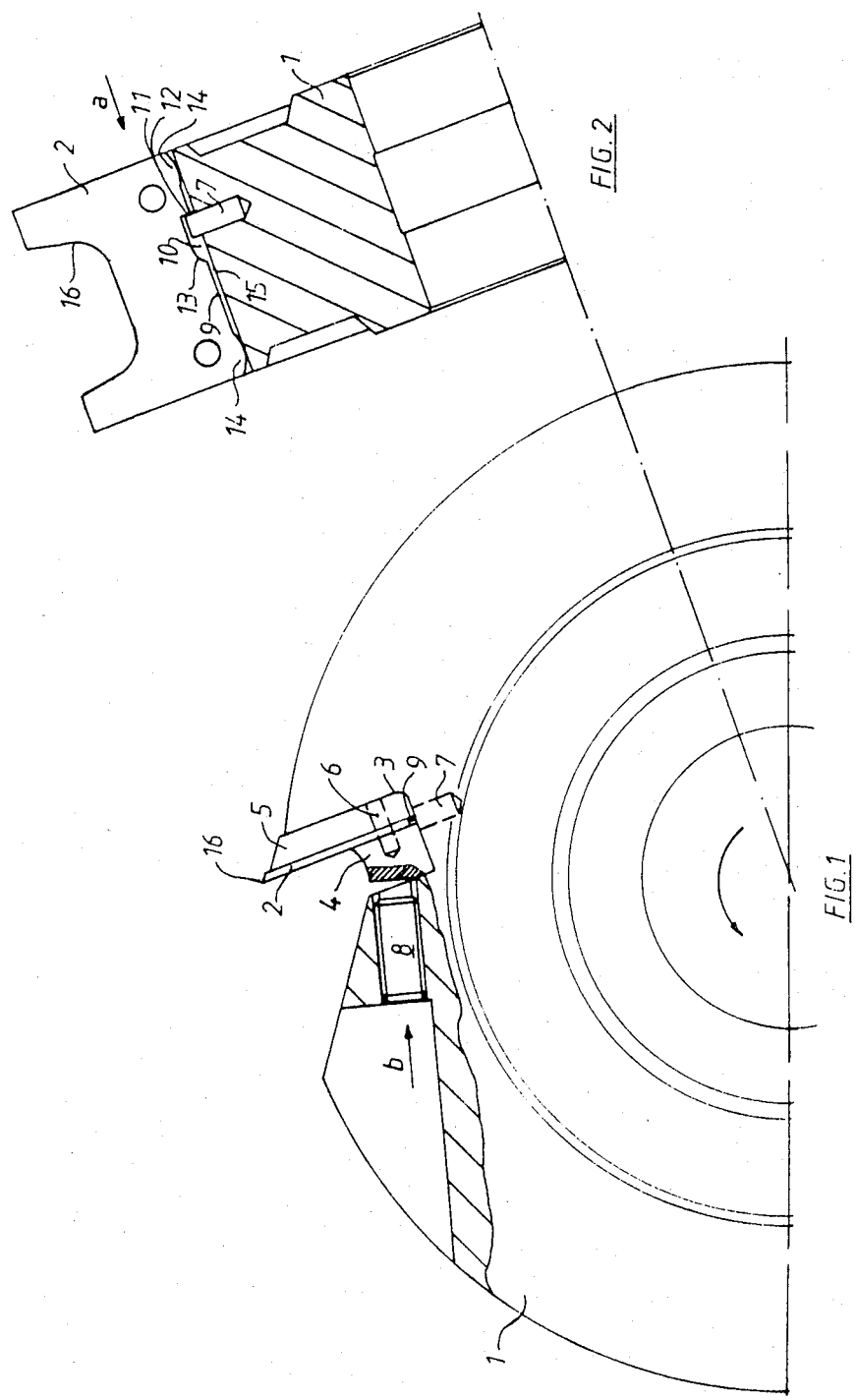

MILLING CUTTER HAVING INTERCHANGEABLE CUTTER BLADES

BACKGROUND OF THE INVENTION

The invention relates to a milling cutter having interchangeable cutter blades which are fixed in grooves in the milling cutter body by means of clamping elements and are radially supported on two support mountings and axially supported on one support mounting.

In known milling cutters, the cutter blades are supported by means of 3-point contact relative to the milling cutter body. The seating for the cutter blades must be very accurate, so that true-to-size and flat surfaces can be obtained on the workpiece to be machined. In profile milling cutters, on the milling cutter body of which are arranged several cutter blades on the periphery, the axial and radial alignment of all cutter blades must of course conform very accurately.

A milling cutter having interchangeably arranged cutter blades in the milling cutter body is known from the German Patent Specification No. 1,427,077, in which milling cutter the clamping elements provided for fixing the cutter blades have mounting dogs which form in each case 3-point contact for the cutter blades. The clamping elements with the clamping dogs are inserted in recesses at the milling cutter body and are clamped in the recess by means of further clamping wedges. In this known milling cutter, a total of four clamping elements are required for fixing the cutter blade, two of which clamping elements have mounting dogs. The tolerance of the seating points at the mounting dogs is negatively affected by the production tolerances of the recesses at the milling cutter body and by the production tolerances of the clamping elements having the mounting dogs. Furthermore, the position of the respectively active cutting edge of the cutter blade is also affected by the dimensional accuracy of the respective cutter blade. In this known milling cutter, it is thus very difficult to obtain an adjustment which is accurate and consistent for all cutter blades.

The object of the invention is to create a milling cutter having interchangeable cutting blades, in which the mountings determining the axial and radial position of the cutter blades can be manufactured to a high accuracy in a simple manner.

SUMMARY OF THE INVENTION

In the case of a milling cutter of the generic type mentioned at the beginning, this object is achieved in that the cutter blades, in each case on their lower side opposite their cutting edge, have as support mountings two radially aligned mounting elements and an axially aligned mounting element, that, at the milling cutter body, flat seating surfaces are provided in the grooves for the cutter blades, and that at least one stop element is in each case provided in the grooves and sits against the axial mounting element. The flat seating surfaces in the grooves can be produced comparatively simply with high accuracy. The cutter blades, with mounting elements at their lower side, are placed on these seating surfaces which are preferably made as mounting dogs. The accuracy of the radial alignment of the cutter blades is thus determined by the accuracy of the contact surface in the associated groove and by the dimensional accuracy of the mounting elements or mounting dogs integrally formed on the cutter blade. As axially acting stop elements, a pin projecting perpendicularly outward at the seating surface is preferably provided in each groove, against which pin sits the axially aligned mounting element of the inserted cutter blade. At the milling cutter body, therefore, in each case only one flat seating surface and an axially acting stop element are required as seats for the cutter blades, against which stop element the cutter blades sit directly without intermediate pieces. Moreover, it is still of particular importance that the mounting elements provided on the cutter blades can be made in a joint milling operation, so that the position of the mounting elements conforms very accurately for all cutter blades.

A further embodiment of the invention provides that the axial mounting element forms a lateral termination of a recess provided at the lower side of the cutter blade. In order to align the cutter blades axially they have a recess at their lower side in which the respectively associated stop element of the milling cutter body engages from below. Before the cutter blades are inserted into the corresponding grooves, the cutter blades, with a support plate and a clamping wedge, can be assembled into a cassette which is pushed laterally into the groove until the cutter blade, with one side of the recess, sits against the stop element.

A particularly advantageous further embodiment is obtained in that the lateral termination of the recess opposite the axial mounting element is sloped or arched. In this way, it can be insured that the cutter blade is not inserted in a laterally inverted manner, because the sloped or arched side of the recess cannot form a stop. A cutter blade inserted in a laterally inverted manner, when being pushed in laterally, would therefore slip away over the stop element projecting at the milling cutter body. For this purpose, the sloped or arched termination of the recess can form an obtuse angle with the lower side of the cutter blade.

Wrong insertion of the cutter blades can also be avoided in that the axial mounting element is arranged at a distance from the center of the lower side. This asymmetrical arrangement of the recess and the recess termination sloped or arched on one side insures to a considerable extent that the cutter blades are not assembled in a laterally inverted manner at the milling cutter body.

Advantageous further embodiments are characterized hereinbelow.

BRIEF DESCRIPTION OF THE DRAWINGS

The invention is described in greater detail with reference to the drawings which shows illustrative embodiments and wherein:

FIG. 1 shows the end face of a milling cutter having interchangeable cutter blades;

FIG. 2 shows a sectional side view of the milling cutter of FIG. 1; and

DETAILED DESCRIPTION

Figure 3:
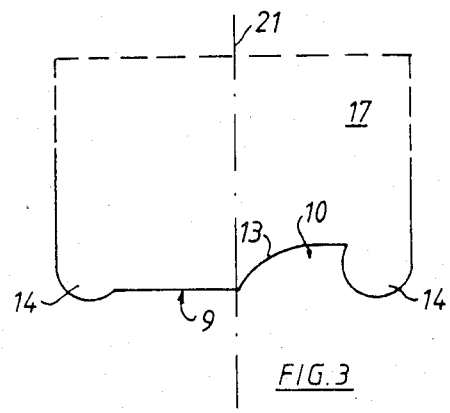
FIGS. 3 and 4 show cutter blades having different embodiments of mounting elements and recesses.

The milling cutter partially shown in FIG. 1 essentially consists of a milling cutter body 1 and cutter blades 2 which are inserted into corresponding grooves 3 made at the milling cutter body 1. Moreover, these can be three grooves which are arranged in distributed manner at the periphery of the milling cutter body 1 and have associated cutter blades. However, for the sake of simplicity only one groove 3 with an associated cutter blade 2 is shown.

The cutter blade 2 is located between two clamping elements, namely, a clamping wedge 4 and a support plate 5 which, together with the cutter blade 2, form a cassette. Centering pins 6 are provided so that the individual parts of the cassette do not mutually slip.

The cutter blades 2 are fastened to the milling cutter body 1 in such a way that the pre-assembled cassette is pushed in from above into the groove 3 and pressed against the stop element 7 according to the arrow direction as shown in FIG. 2. The cassette is secured in this position in the groove 3 by means of a locking screw 8. For this purpose, the locking screw 8 is turned into the milling cutter body 1 in the arrow direction b, so that it fastens with the clamping wedge 4. At its lower side 9, the cutter blade 2 has a recess 10, a lateral termination 11 of which forms an axially acting mounting element 12. The lateral termination 13 of the recess 10 opposite the mounting element 12 runs in a curved shape and forms an obtuse angle with the lower side 9. If the cutter blade 2 were inserted between the clamping wedge 4 and the support plate 5 in a laterally inverted manner, this would lead to the cutter blade 2 being pushed with the arched lateral termination 13 against the stop element 7. However, the arched or curved termination 13 cannot act as a stop or mounting, for which reason the cassette with the cutter blade 2 would be pushed away via the stop element 7. A laterally inverted assembly of the cutter blade 2 is therefore impossible in this manner.

As radially acting mounting elements, the cutter blade 2, on the outside at the outer side 9, has two integrally formed mounting dogs 14 which sit on a flat seating surface 15. The seating surface 15 forms the groove route of the groove 3.

The cutter blade 2 shown in FIGS. 1 and 2 has a U-shaped cutting edge 16 which is used, for example, for milling profile strips from wood. The radially acting mounting dogs 14 are made in a circular shape, so that a linear contact is obtained. By arching the contact surface 15 or by the use of spherical mounting dogs 14, a punctiform seating can also be obtained. In particular in the case of narrow cutter blades, the contact surface 15 can be ground flat and the mounting dogs 14 can be made cylindrical.

In FIG. 2, the axial mounting element 12 is shown as a straight stop; however, this mounting element 12 is also preferably made as a mounting dog.

Figure 4:
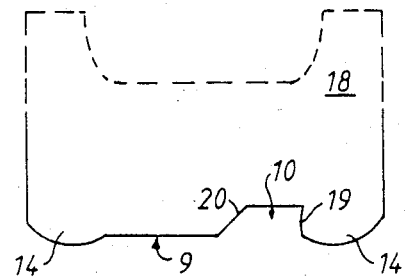

In the cutter blade 17 shown in FIG. 3, the right-hand mounting dog 14 is made as a radially acting mounting element and as an axial mounting element. In the cutter blade 18 shown in FIG. 4, an axially acting mounting dog 19 is provided which has another radius than the radially acting mounting dogs 14. The side of the recess 10 opposite the axially acting mounting dog 19 is made as a slope 20 in this illustrative embodiment. The arched terminations 13 shown in FIGS. 2 and 3 and the slope 20 shown in FIG. 4 each form an obtuse angle with the lower side 9, which obtuse angle is of such a size that these lateral terminations of the recesses 10 cannot act as a stop for the stop element 7.

In the illustrative embodiments shown, the axially acting mounting elements 12 and 19 are arranged at a distance from the center 21 of the cutter blades 2, 17 and 18, by which means a laterally inverted insertion of the cutter blades can likewise be avoided.

It should also be pointed out that in the case of cutter blades arranged at an angle in which the lower side 9, just like the seating surface 15, does not run parallel to the axis of rotation, the stop elements 7 engaging in the recesses 10 prevent lateral shifting of the cutter blades. The arrangement of the stop element 7, made for example as a straight pin, enables, in conjunction with the lateral terminations of the respectively associated recess 10, a problem-free and accurate assembly and a secure fixing of the cutter blades.

It should also be noted that the mounting elements preferably made as mounting dogs can also be made in another optional form.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A milling cutter having interchangeable cutter blades which are fixed in grooves in the milling cutter body by means of clamping elements and are radially supported on two support mountings and axially supported on one support mounting, wherein the cutter blades, in each case on their lower side opposite their cutting edge, have as support mountings two radially aligned mounting elements and an axially aligned mounting element which forms a lateral termination of a recess provided at the lower side of the cutter blade wherein said lateral termination of the recess opposite the axially aligned mounting element is sloped or arched, wherein, at the milling cutter body, flat seating surfaces are provided in the grooves for the cutter blades, and wherein at least one stop element is in each case provided in the grooves and sits against the axial mounting element.

2. A milling cutter as claimed in claim 1 wherein the lower side of the cutter blade forms an obtuse angle with the sloped or arched termination of the recess.

3. A milling cutter as claimed in claim 1 wherein the axial mounting element is arranged at a distance from the center of the lower side.

4. A milling cutter as claimed in claim 1 wherein the radially aligned mounting elements are made as mounting dogs.

5. A milling cutter as claimed in claim 4 wherein the cutter blades having mounting dogs are each one-piece plates made of sintered carbide.

6. A milling cutter as claimed in claim 4 wherein the mounting dogs are radially acting and are made in a circular shape.

7. A milling cutter as claimed in claim 1 wherein the stop elements are pins projecting perpendicularly outward at the seating surfaces.

8. A milling cutter as claimed in claim 1 wherein said stop element projects perpendicularly outwardly therefrom.

9. A milling cutter according to claim 1 wherein said stop element engages said recess from below.

10. A milling cutter as claimed in claim 1 wherein said mounting elements are integrally formed on the cutter blade.

* * * * *